(12) United States Patent
Matsuki et al.

(10) Patent No.: US 9,628,646 B2
(45) Date of Patent: Apr. 18, 2017

(54) AUGMENTED REALITY OPERATION SYSTEM AND AUGMENTED REALITY OPERATION METHOD

(71) Applicant: KYOCERA Document Solutions Inc., Osaka (JP)

(72) Inventors: Yoshitaka Matsuki, Osaka (JP); Tomohiro Kawasaki, Osaka (JP); Kunihiko Shimamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/135,853

(22) Filed: Apr. 22, 2016

(65) Prior Publication Data

US 2016/0316081 A1  Oct. 27, 2016

(30) Foreign Application Priority Data

Apr. 25, 2015 (JP) ................................. 2015-089901

(51) Int. Cl.
*H04N 1/00* (2006.01)
*G06F 3/01* (2006.01)
*G06F 3/03* (2006.01)
*G06F 3/12* (2006.01)

(52) U.S. Cl.
CPC ......... *H04N 1/00413* (2013.01); *G06F 3/011* (2013.01); *G06F 3/017* (2013.01); *G06F 3/0304* (2013.01); *G06F 3/12* (2013.01); *H04N 1/00493* (2013.01)

(58) Field of Classification Search
None
See application file for complete search history.

(56) References Cited

U.S. PATENT DOCUMENTS

| 9,310,883 | B2* | 4/2016 | Weising | .......... G09G 5/08 |
| 2006/0293765 | A1* | 12/2006 | Tanaka | ........... H04N 1/00408 |
| | | | | 700/15 |
| 2009/0135135 | A1* | 5/2009 | Tsurumi | .......... G06F 3/017 |
| | | | | 345/156 |
| 2012/0019858 | A1 | 1/2012 | Sato | |
| 2012/0026530 | A1* | 2/2012 | Tsongas | ........... H04N 1/00307 |
| | | | | 358/1.14 |
| 2012/0113223 | A1* | 5/2012 | Hilliges | .......... G06F 3/00 |
| | | | | 348/46 |

(Continued)

FOREIGN PATENT DOCUMENTS

JP    2012-029164 A    2/2012

*Primary Examiner* — Ming Hon
(74) *Attorney, Agent, or Firm* — IP Business Solutions, LLC

(57) ABSTRACT

An augmented reality operation system includes: an image-taking device, a display device, an MFP, an augmented reality processing section displaying, on the display device, a synthetic image obtained by synthesizing an operation image illustrating an operation section for operating the MFP with a taken image taken by the image-taking device, and an operation reception section receiving operation on the operation section in the operation image. The operation reception section, based on a position (on the synthetic image) of a hand taken by the image-taking device and a position of the operation section on the synthetic image, receives the operation on the operation section.

2 Claims, 15 Drawing Sheets

(56) References Cited

U.S. PATENT DOCUMENTS

| | | | |
|---|---|---|---|
| 2012/0327003 A1* | 12/2012 | Matsumura | G06F 3/04883 345/173 |
| 2013/0041648 A1* | 2/2013 | Osman | H04S 7/302 704/2 |
| 2013/0142371 A1* | 6/2013 | Martin | H04R 1/025 381/333 |
| 2013/0257848 A1* | 10/2013 | Westerinen | G06F 3/147 345/419 |
| 2014/0063542 A1* | 3/2014 | Aoki | G06F 3/1296 358/1.15 |
| 2014/0232747 A1* | 8/2014 | Sugimoto | G06F 3/011 345/633 |
| 2016/0217617 A1* | 7/2016 | Barribeau | G06F 3/04815 |
| 2016/0232369 A1* | 8/2016 | Nuggehalli | G06F 21/6218 |
| 2016/0349926 A1* | 12/2016 | Okumura | G06F 3/0488 |

* cited by examiner

Fig.13
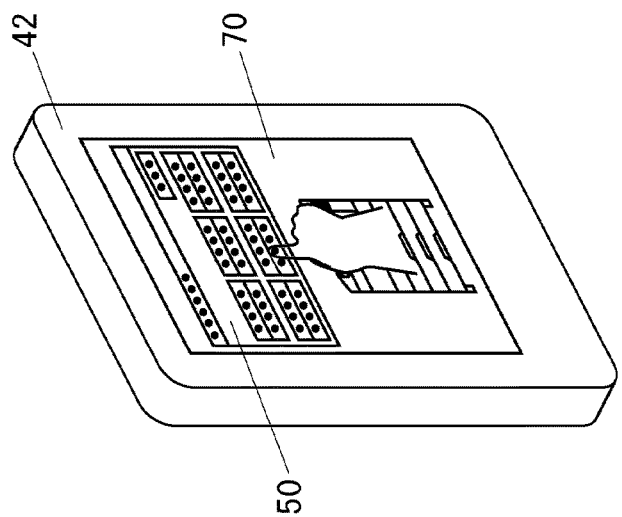
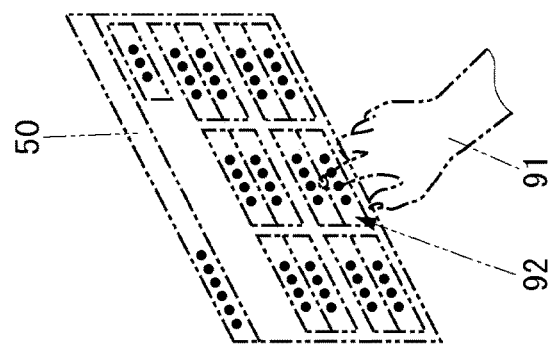
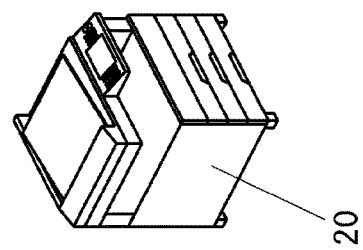

AUGMENTED REALITY OPERATION SYSTEM AND AUGMENTED REALITY OPERATION METHOD

INCORPORATION BY REFERENCE

This application claims priority to Japanese Patent Application No. 2015-089901 filed on Apr. 25, 2015, the entire contents of which are incorporated by reference herein.

BACKGROUND

This disclosure relates to an augmented reality operation system and a non-transitory computer-readable recording medium storing an augmented reality operation program, and to a technology of displaying a synthetic image obtained by synthesizing an operation image for operating an electronic device with an image taken, and receiving operation on an operation section in the operation image.

A typical image forming system is known which displays, on a touch panel, a synthetic image obtained by synthesizing an operation image for operating an image forming apparatus with an image taken, and then receives, on the touch panel, operation on an operation section in the operation image. However, this typical image forming system needs a touch panel operated through direct touch by a user.

SUMMARY

According to an aspect of this disclosure, an augmented reality operation system includes: an image-taking device, a display device, an electronic device, an augmented reality processing section, and an operation reception section.

The augmented reality processing section displays, on the display device, a synthetic image obtained by synthesizing an operation image illustrating an operation section for operating the electronic device in a manner such that the operation image is viewed to be located at a predefined position in a virtual space in a taken image taken by the image-taking device.

The operation reception section receives operation on the operation section illustrated by the operation image. The operation reception section, based on a position (on the synthetic image) of an image illustrating a hand included in the taken image taken by the image-taking device and a position of the operation section illustrated by the operation image on the synthetic image, receives the operation for the electronic device performed on the operation section illustrated by the operation image.

According to another aspect of this disclosure, a non-transitory computer-readable recording medium stores an augmented reality operation program, and this augmented reality operation program causes a computer to function as: an augmented reality processing section displaying, on a display device, a synthetic image obtained by synthesizing an operation image illustrating an operation section for operating an electronic device with an image taken by an image-taking device; and an operation reception section receiving operation on the operation section illustrated by the operation image.

The augmented reality operation program further causes the computer to function in a manner such that, based on a position on the synthetic image of an image illustrating a hand included in the image taken by the image-taking device and on a position of the operation section illustrated by the operation image on the synthetic image, the operation reception section receives the operation for the electronic device performed on the operation section illustrated by the operation image.

BRIEF DESCRIPTION OF THE DRAWINGS

FIG. 13 is a perspective diagram illustrating the MFP, the virtually arranged operation image and hand, and the display device in FIG. 12;

DETAILED DESCRIPTION

Hereinafter, as one aspect of this disclosure, an augmented reality operation system and a computer-readable non-transitory recording medium storing an augmented reality operation program will be described with reference to the drawings.

Figure 1:
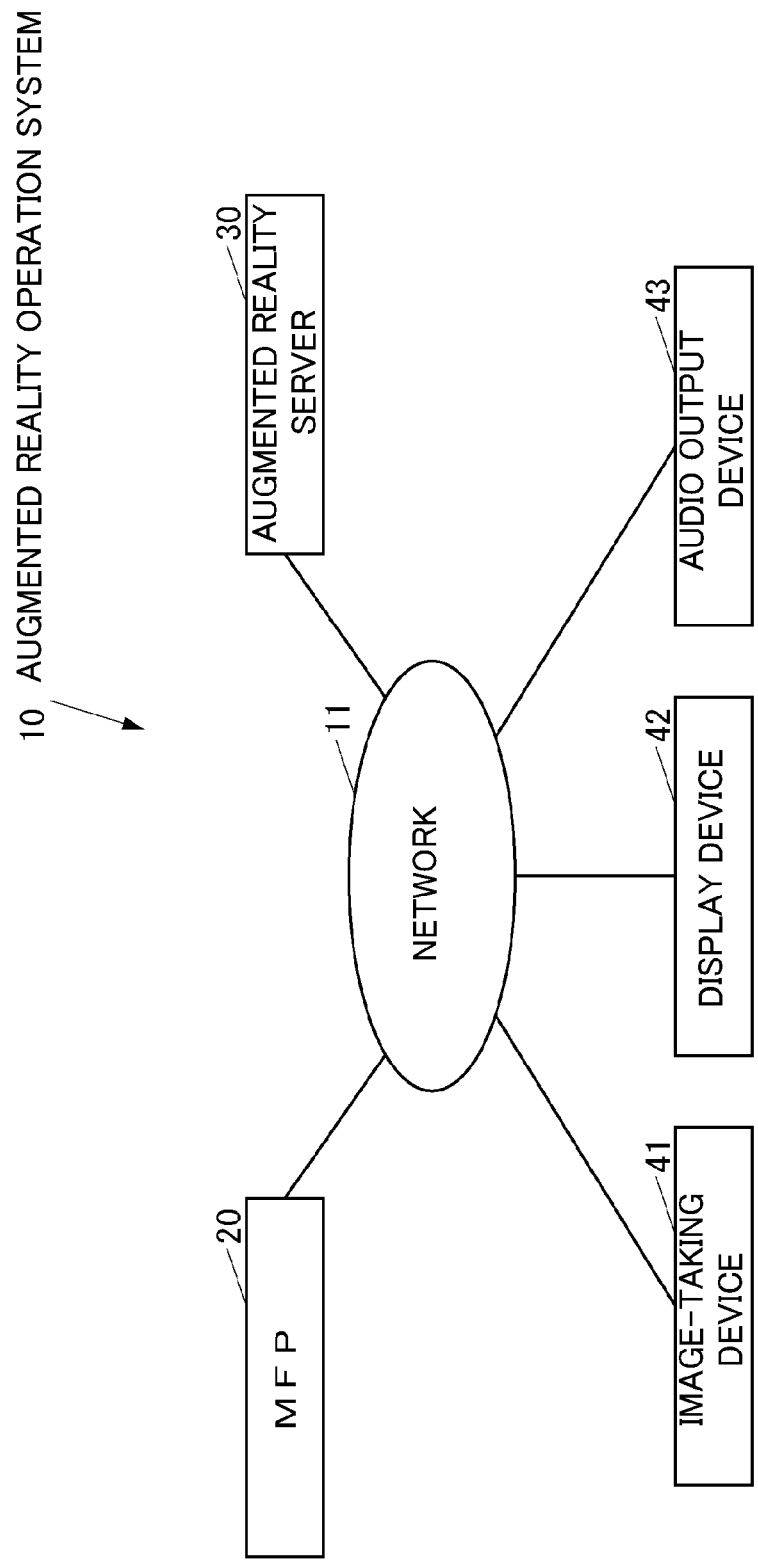
FIG. 1 is a schematic diagram illustrating a configuration of an augmented reality operation system according to one embodiment of this disclosure.

First, configuration of the augmented reality operation system according to this embodiment will be described. FIG. 1 is a schematic diagram illustrating a configuration of the augmented reality operation system 10 according to this embodiment.

As illustrated in FIG. 1, the augmented reality operation system 10 includes: a multifunction peripheral (MFP) 20 as an electronic device of this disclosure, an augmented reality (AR) server 30, such as a personal computer (PC), which realizes augmented reality (AR), an image-taking device 41 such as a camera, a display device 42 such as a liquid crystal display (LCD), and an audio output device 43 such as a speaker. The MFP 20, the AR server 30, the image-taking device 41, the display device 42, and the audio output device 43 are connected via a network 11 such as a local area network (LAN) or the Internet in a manner such as to be capable of communicating with each other.

Figure 2:
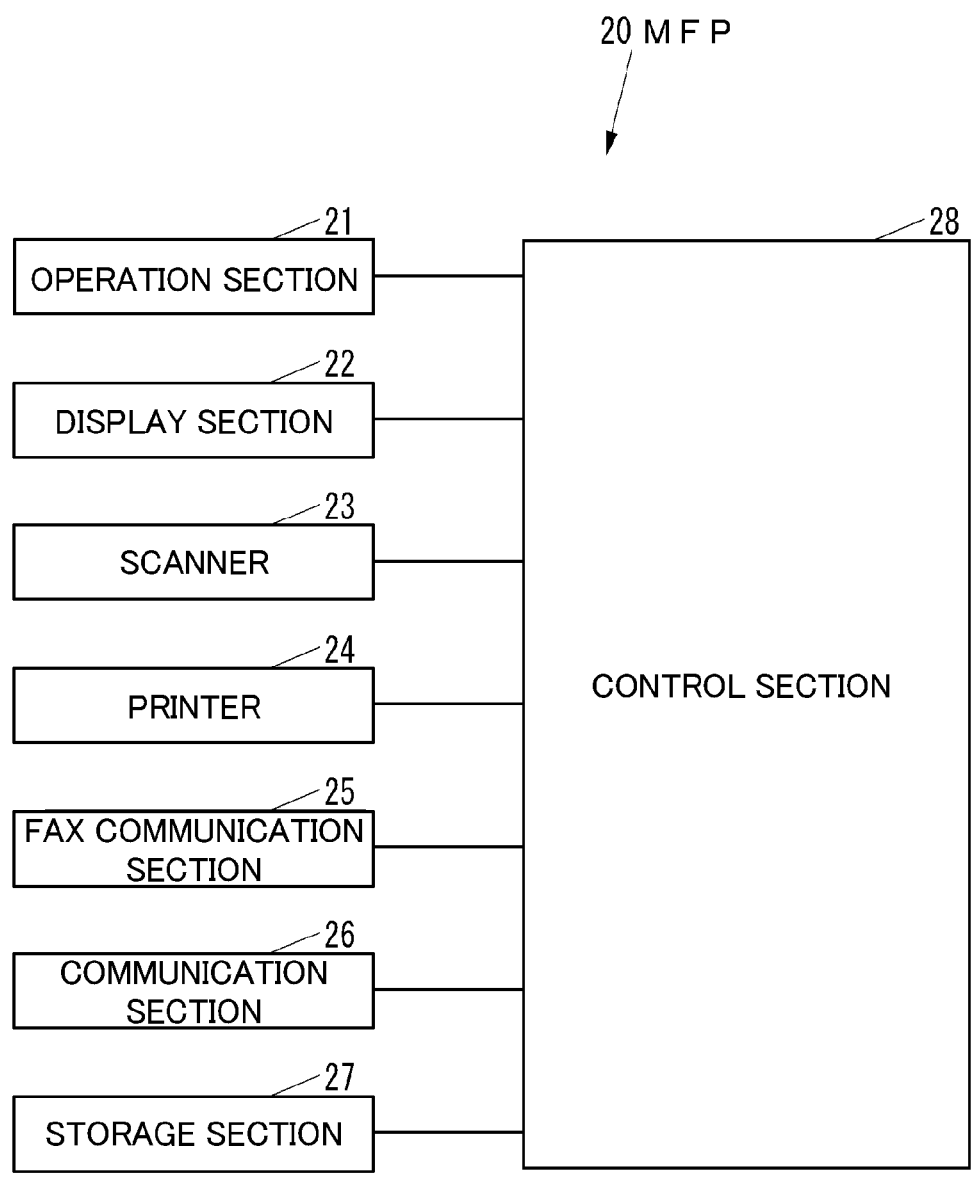
FIG. 2 is a schematic diagram of a block configuration of an MFP in FIG. 1.

FIG. 2 is a schematic diagram of a block configuration of the MFP 20. As illustrated in FIG. 2, the MFP 20 includes: an operation section 21 as an input device such as buttons into which various kinds of operation by a user are inputted; a display section 22 as a display device such as the LCD which displays various pieces of informing; a scanner 23 as a reading device which reads an image from a document; a printer 24 as a printing device which executes printing on a recording medium such as paper; a fax communication section 25 as a fax device which performs fax communication with an external facsimile device, not illustrated, via a communication line such as a public phone line; a communication section 26 as a communication device which performs communication with an external device via the network 11 (see FIG. 1); a storage section 27 as a nonvolatile storage device such as an electrically erasable programmable read only memory (EEPROM, registered trademark) or a hard disk drive (HDD); and a control section 28 which controls the entire MFP 20.

The control section 28 includes: for example, a central processing unit (CPU); a read only memory (ROM) which stores programs and various pieces of data; and a random access memory (RAM) used as a working area of the CPU. The CPU can execute programs stored in the ROM or the storage section 27.

Figure 3:
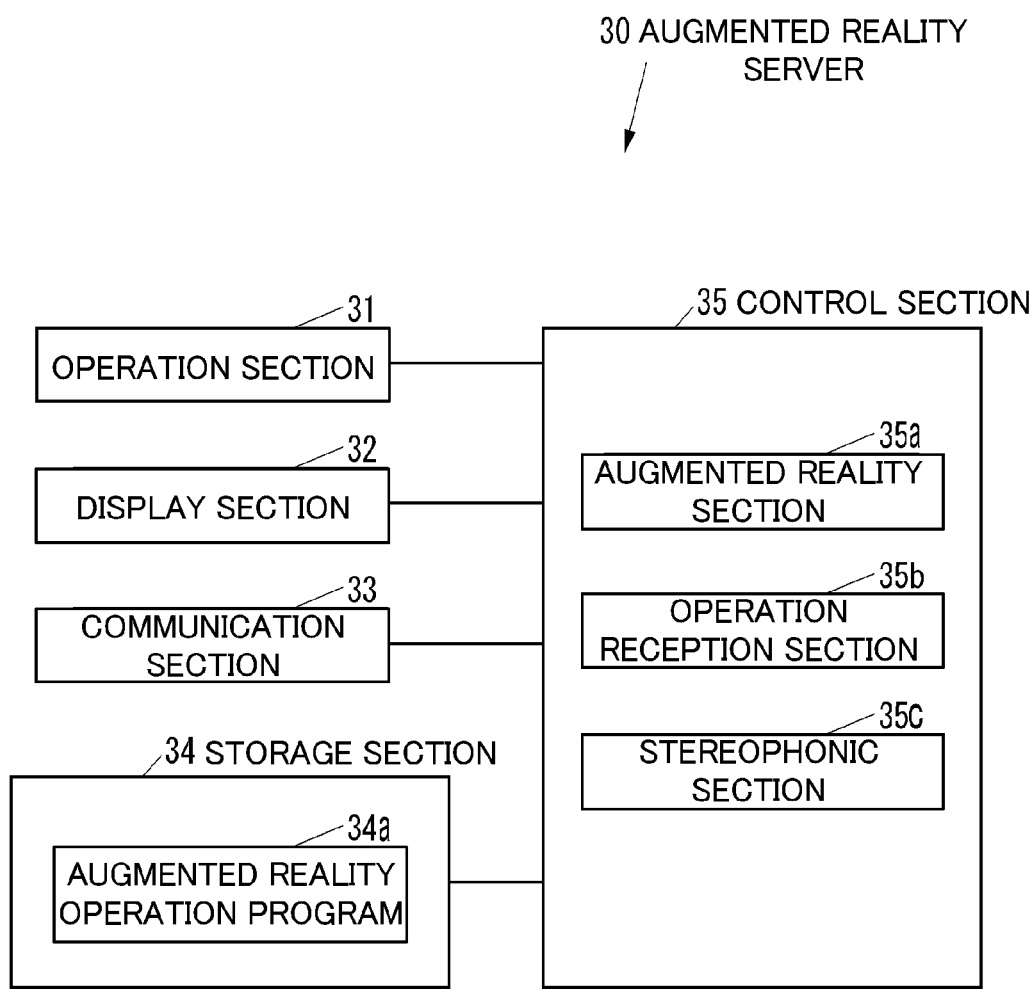
FIG. 3 is a schematic diagram of a block configuration of an augmented reality server in FIG. 1.

FIG. 3 is a schematic diagram of a block configuration of the AR server 30. As illustrated in FIG. 3, the AR server 30 includes: an operation section 31 as an input device such as a mouse or a keyboard through which various kinds of operation by the user are inputted; a display section 32 as a display device such as the LCD which displays various pieces of informing; a communication section 33 as a communication device which performs communication with the external device via the network 11 (see FIG. 1); a storage section 34 as a nonvolatile storage device such as the HDD which stores various pieces of data; and a control section 35 which controls the entire AR server 30. Note that the display section 32 is part of the operation section 31.

The storage section 34 stores an AR operation program 34a which is executed by the control section 35. The AR operation program 34a may be installed in the AR server 30 at a stage at which the AR server 30 is manufactured, may be additionally installed in the AR server 30 from a computer-readable non-transitory recording medium, for example, an external storage medium such as a compact disk (CD), a digital versatile disk (DVD), or a universal serial bus (USB) memory, or may be additionally installed in the AR server 30 from the network 11.

The control section 35 includes: for example, a CPU, a ROM which storages programs and various pieces of data; and a RAM used as a working area of the CPU. The CPU executes programs stored in the ROM or the storage section 34.

The control section 35, by executing the AR operation program 34a stored in the storage section 34, functions as: an AR processing section 35a which displays, on the display device 42, a synthetic image obtained by synthesizing an operation image for operating the MFP 20 with an image taken by the image-taking device 41; an operation reception section 35b which receives operation performed for the operation section in the operation image; and a stereophonic section 35c which makes the audio output device 43 output operation sound for the operation section through a stereophonic technology in a manner such that the operation sound is outputted at a position in a real space corresponding to a position of the operation section in the synthetic image.

Figure 4:
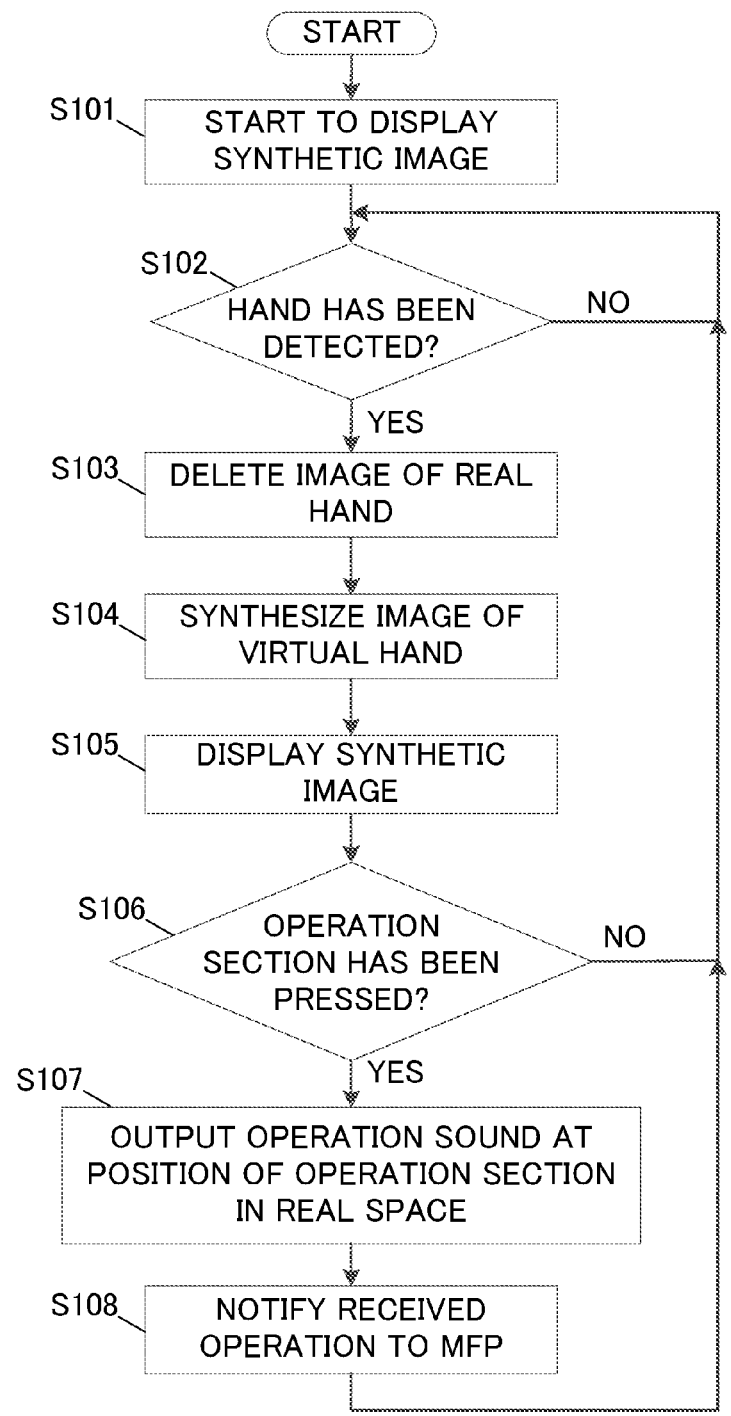
FIG. 4 is a flowchart of operation performed by the augmented reality server in FIG. 3 when operating the MFP.

Next, operation of the AR operation system 10 will be described. FIG. 4 is a flowchart of operation performed by the AR server 30 when operating the MFP 20.

Figure 5:
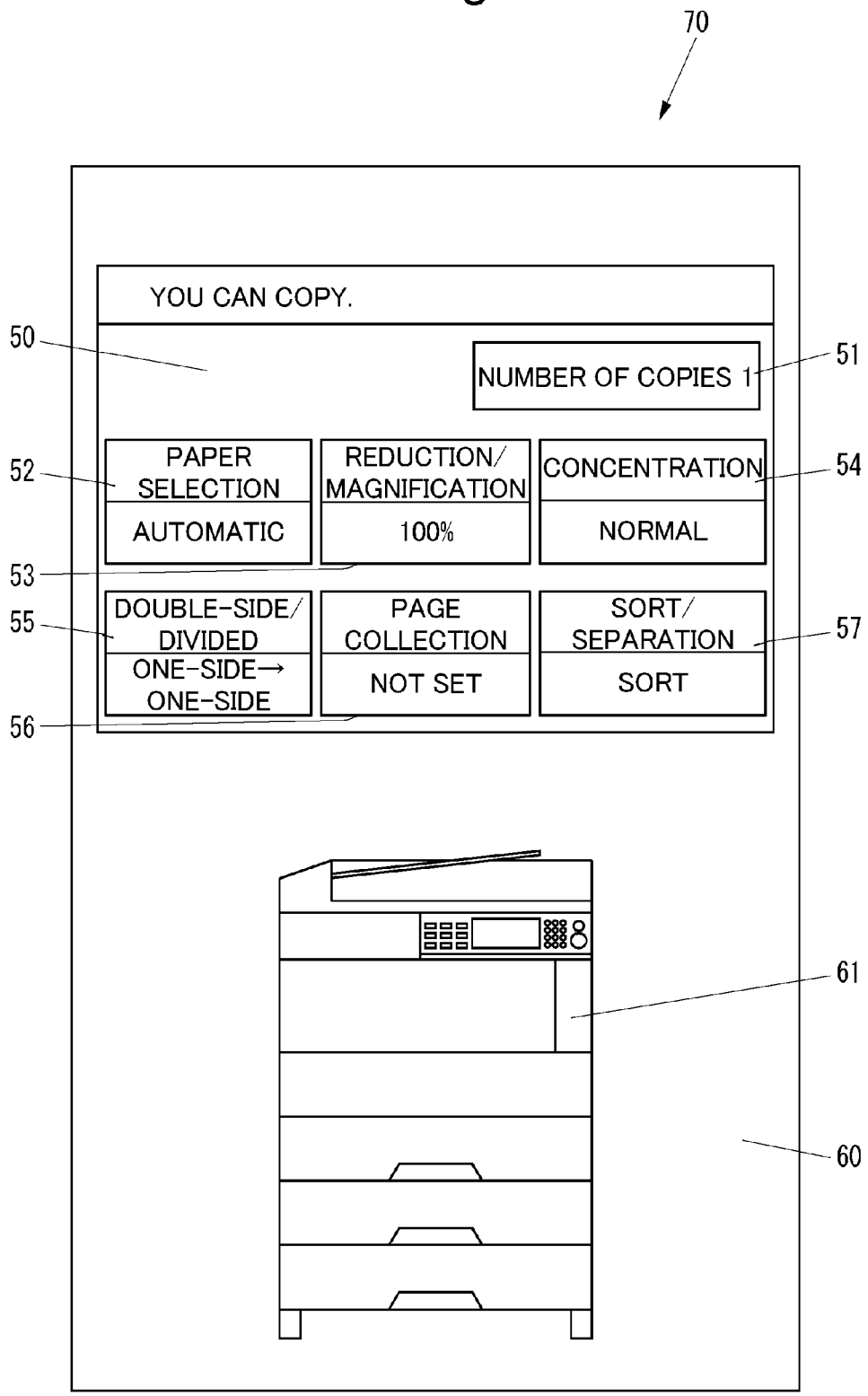
FIG. 5 is a schematic diagram illustrating one example of a synthetic image displayed on a display device in FIG. 1.

Upon start of image-taking by the image-taking device 41, the AR processing section 35a of the AR server 30, through either of a location base AR based on position informing and a vision base AR based on image processing, as illustrated in FIG. 5, starts to display, on the display device 42, a synthetic image 70 obtained by synthetizing a prepared operation image 50 illustrating the operation section 21 of the MFP 20 with a taken image 60 taken by the image-taking device 41 (S101).

FIG. 5 is a schematic diagram illustrating one example of the synthetic image 70 displayed on the display device 42.

The operation image 50 illustrated in FIG. 5 is an image illustrating the operation section 21 of the MFP 20, in particular, the display section 32 of the operation section 21. The operation image 50 is a screen for setting, for example, a function of printing an image, which has been read from a document by the scanner 23 of the MFP 20, on a recording medium by the printer 24 of the MFP 20, that is, a copy function. For example, the operation image 50 illustrated in FIG. 5 includes: a setting reception image 51 for setting a number of copies generated through copying; a setting reception image 52 for setting from which supply source a recording medium will be supplied in a case where there are a plurality of supply sources of recording media in the MFP 20; a setting reception image 53 for setting magnification of the copying; a setting reception image 54 for setting concentration of the copying; a setting reception image 55 for setting whether or not to read both sides of the document and whether or not to perform printing on the both sides of the recording medium; a setting reception image 56 for setting images of how many documents will be printed per recording medium; and a setting reception image 57 for setting whether or not to execute the printing on the recording media in order of documents' page numbers and whether or not to output the printed recording media on an individual print basis. The operation image 50 may be half-translucent.

Moreover, the taken image 60 illustrated in FIG. 5 includes an image 61 of the MFP 20 which is a taken image taken by the image-taking device 41.

Figure 6:
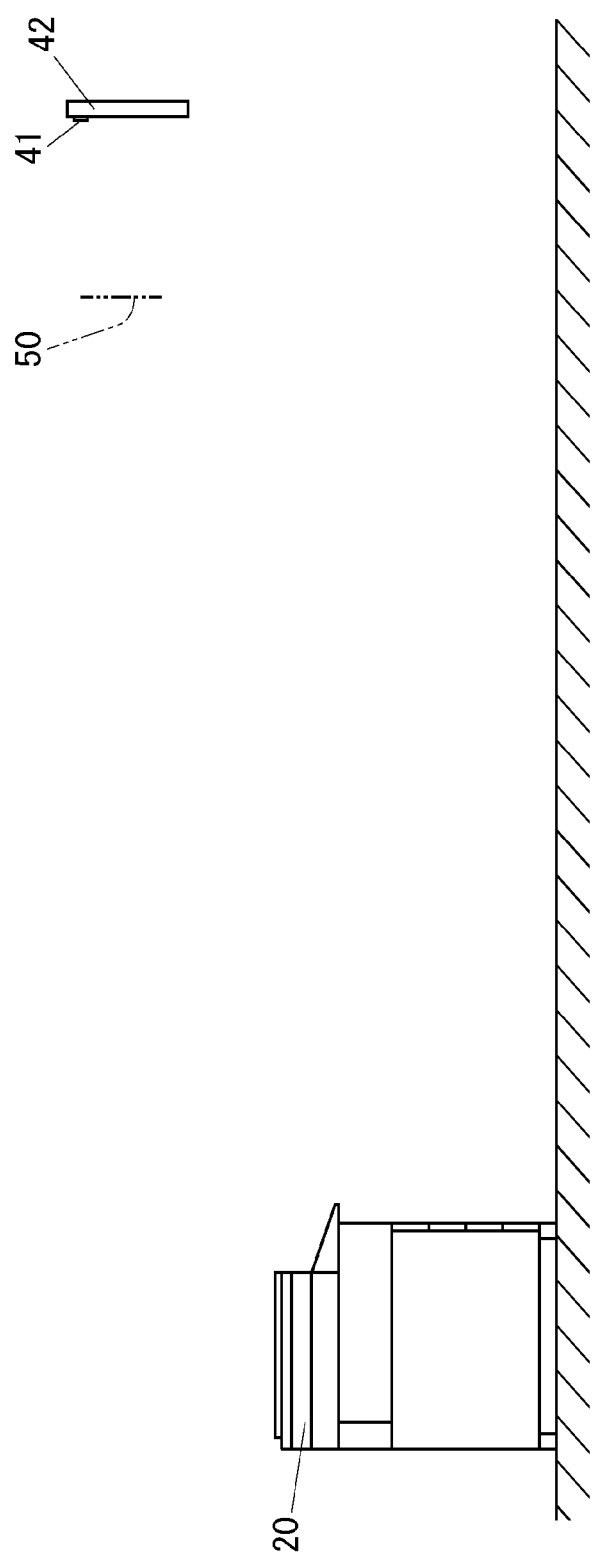
FIG. 6 is a schematic diagram illustrating positional relationship between the MFP, an operation image, an image-taking device, and the display device when viewed from a direction orthogonal to a direction in which image-taking is performed by the image-taking device in a case where the display device displays the synthetic image in FIG. 5.

FIG. 6 is a schematic diagram illustrating positional relationship between the MFP 20, the virtually illustrated operation image 50, the image-taking device 41, and the display device 42 when viewed from a direction orthogonal to a direction in which the image-taking is performed by the image-taking device 41 in a case where the display device 42 displays the synthetic image 70 illustrated in FIG. 5.

The AR processing section 35*a* generates the synthetic image 70 such that the operation image 50 appears, for the user viewing a display screen of the display device 42, to be arranged in a space between the MFP 20 and the display device 42. As a result, upon the display of the synthetic image 70 by the display device 42, as illustrated in FIG. 6, the operation image 50 appears, for the user viewing the synthetic image 70 displayed by the display device 42, to be arranged in the space between the MFP 20 and the display device 42. Note that the operation image 50 is so illustrated in FIG. 6 as to be arranged on a real space for easier understanding, but it is actually not present on the real space.

As illustrated in FIG. 4, the AR processing section 35*a* judges, based on the taken image 60 taken by the image-taking device 41, whether or not an image illustrating a user's hand is present (S102).

Figure 7:
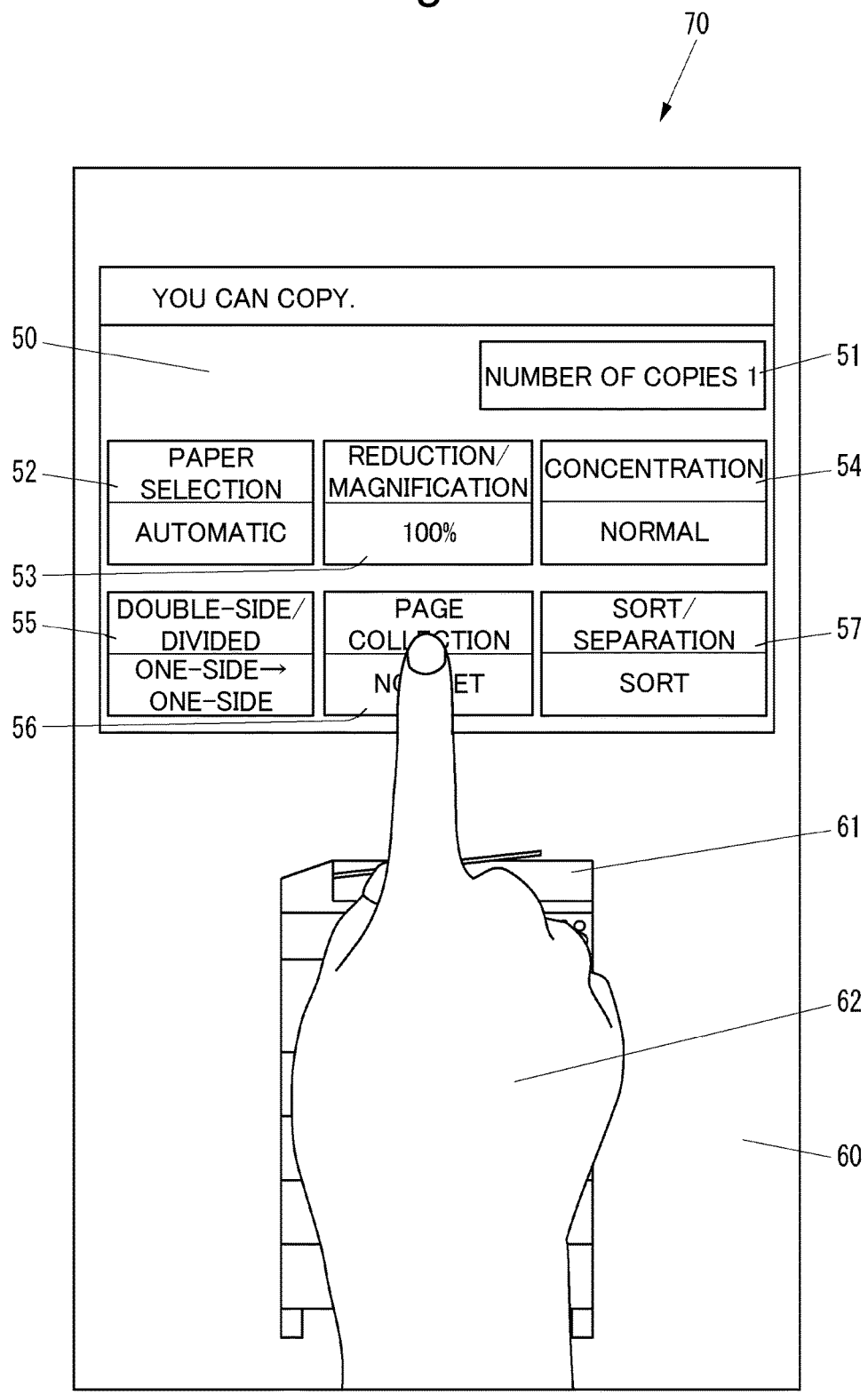
FIG. 7 is a schematic diagram illustrating one example of a synthetic image displayed on the display device in FIG. 1 in a case where a user's hand is located closer to a display device side than the operation image.
Figure 8:
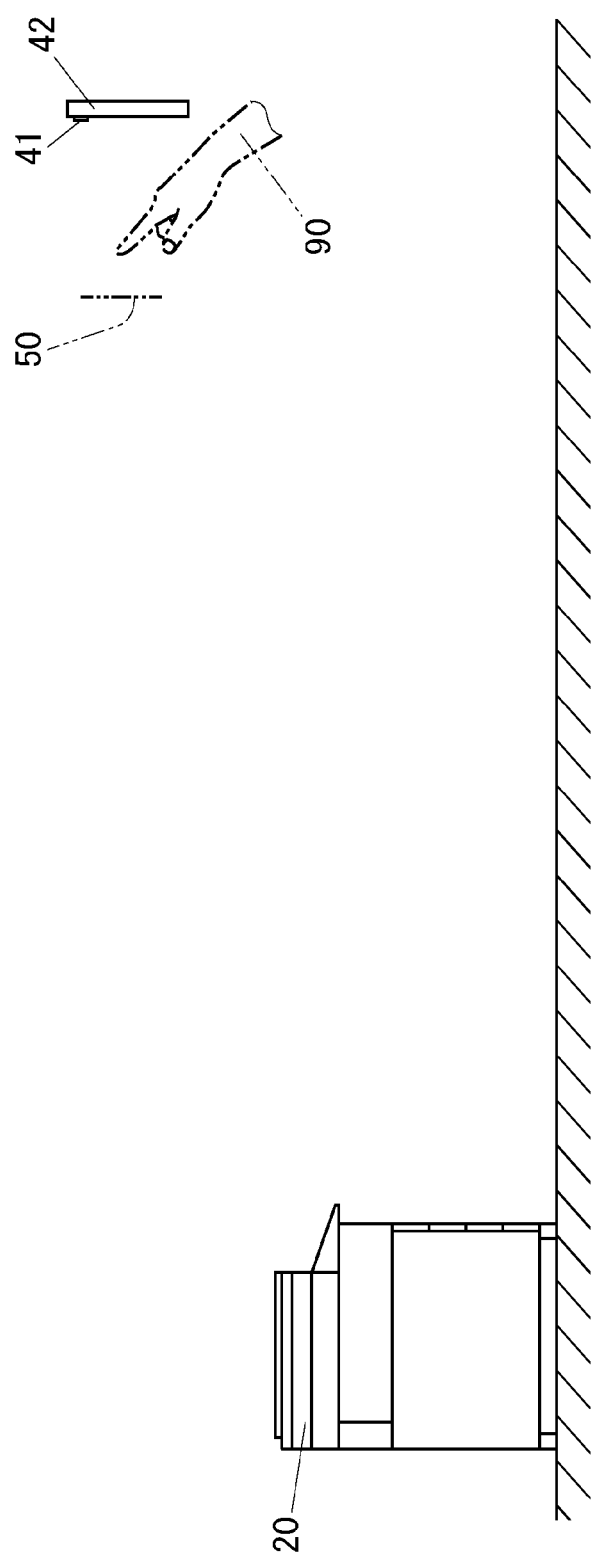
FIG. 8 is a schematic diagram illustrating positional relationship between the MFP, the virtually arranged operation image and hand, the image-taking device, and the display device when viewed from the direction orthogonal to the direction in which the image-taking is performed by the image-taking device in a case where the display device displays the synthetic image in FIG. 7.
Figure 9:
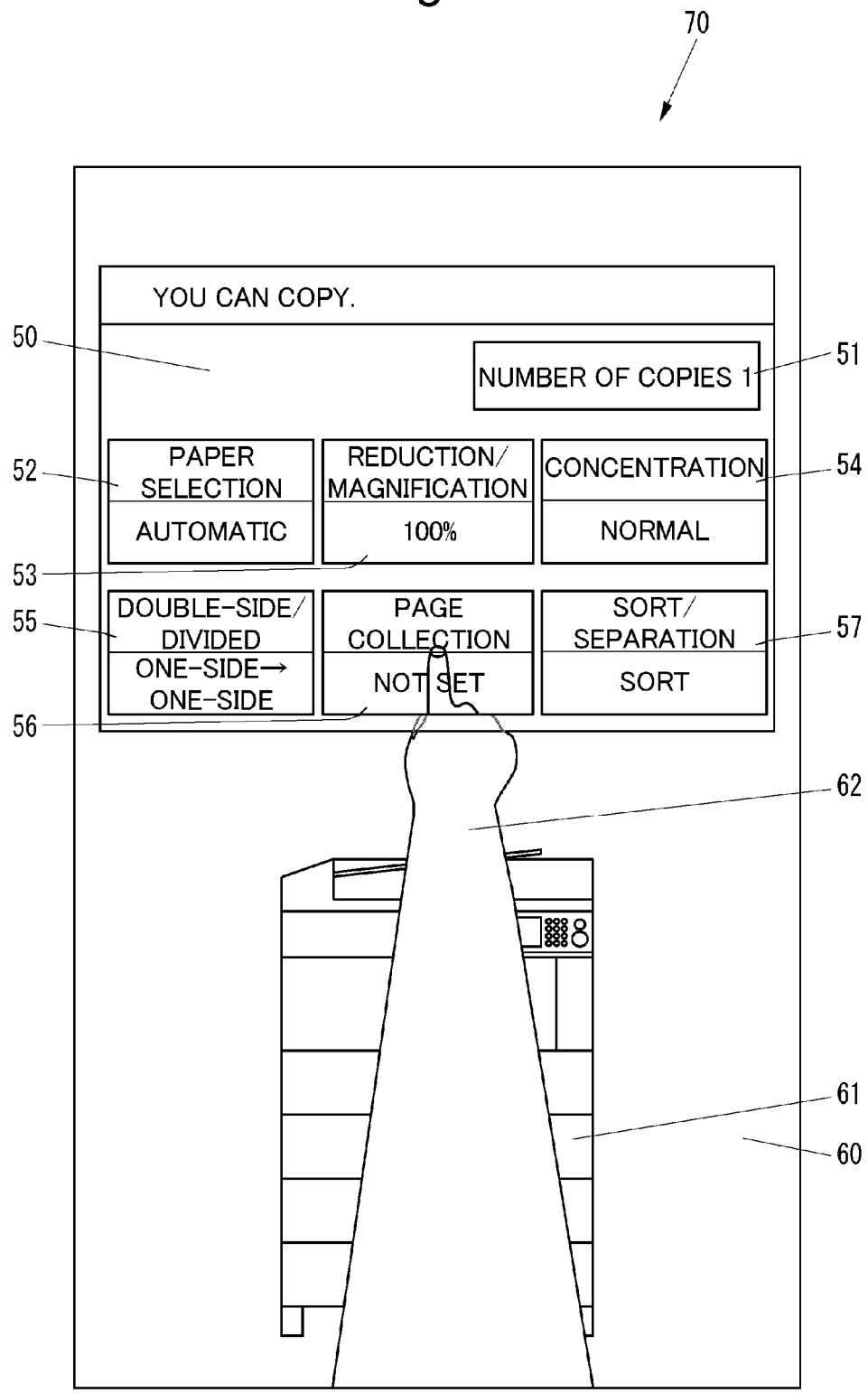
FIG. 9 is a schematic diagram illustrating one example of a synthetic image displayed on the display device in FIG. 1 in a case where the user's hand is located closer to an MFP side than the operation image.
Figure 10:
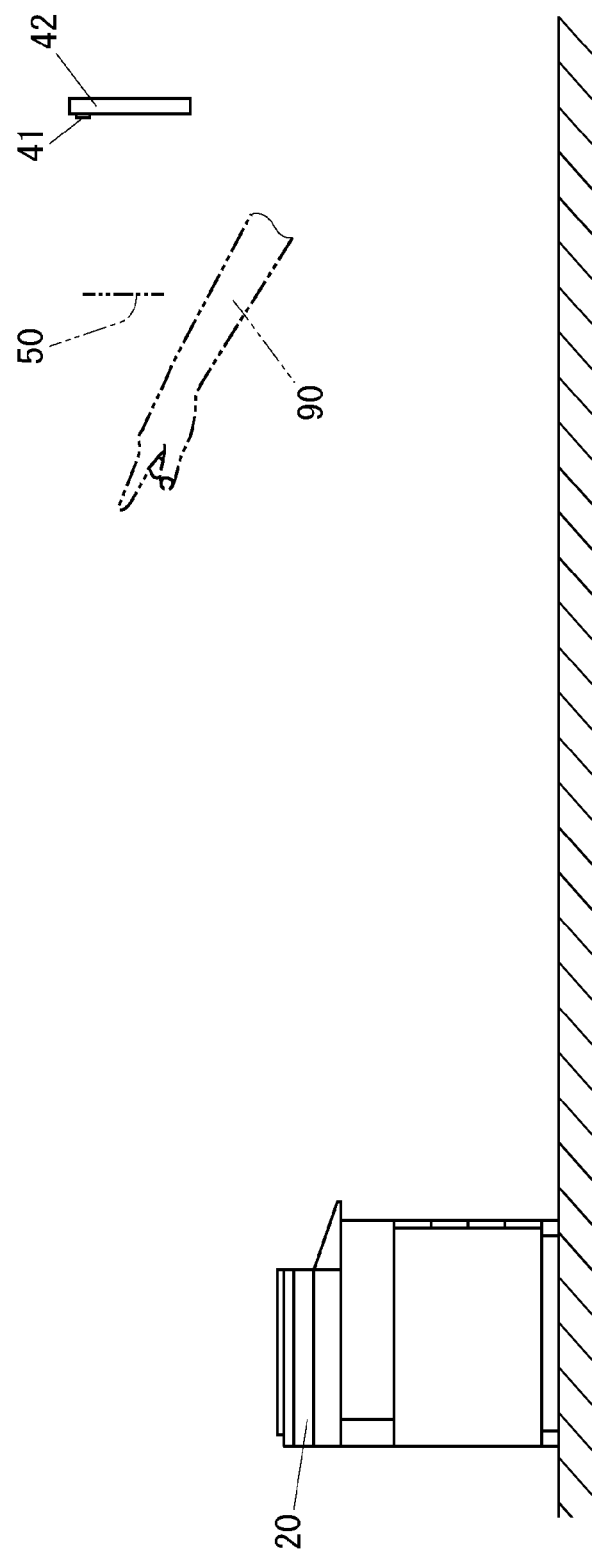
FIG. 10 is a schematic diagram illustrating positional relationship between the MFP, the virtually arranged operation image and hand, the image-taking device, and the display device when viewed from the direction orthogonal to the direction in which the image-taking is performed by the image-taking device in a case where the display device displays the synthetic image in FIG. 9.

For example, the user holds the display device 42 to view the display screen of this display device 42. The AR processing section 35*a* can detect a hand image 62 illustrating a hand 90 of the user on the taken image 60 either upon generation of the synthetic image 70 viewed in a manner such that the hand image 62 lies closer to the display device 42 than the operation image 50 arranged in the aforementioned space, as illustrated in FIGS. 7 and 8, or upon generation of the synthetic image 70 viewed in a manner such that the hand image 62 lies closer to the MFP 20 than the operation image 50, as illustrated in FIGS. 9 and 10. Illustrated in FIGS. 7 and 9 are: the operation image 50; and the synthetic image 70 for easier understanding of vertical relationship in overlapping with the hand image 62, but the AR processing section 35*a* actually judges, by using the taken image 60 in a state in which the operation image 50 is not synthesized, whether or not the hand image 62 is present on the taken image 60. Moreover, in FIGS. 8 and 10, the operation image 50 is drawn in spaces, but this operation image 50 is only virtually illustrated, and as is the case with FIG. 6, the operation image 50 is actually not present on the real spaces.

As illustrated in FIG. 4, the AR processing section 35*a*, upon judgment that the hand image 62 is present on the taken image 60 taken by the image-taking device 41, that is, upon detection of the hand image 62 (YES in S102), deletes the image 62 of the actual hand 90 included in the taken image 60 from the synthetic image 70 through image processing (S103). Therefore, the synthetic images 70 illustrated in FIGS. 7 and 9 turn into those like the synthetic image 70 illustrated in FIG. 5. Possible methods of deleting the image 62 through the image processing of the AR processing section 35*a* include: for example, a method of interpolating from an area around the image 62; and a method of storing the taken image 60 for a specific period and returning an area of the image 62 into a state before appearance of the image 62.

Figure 11:
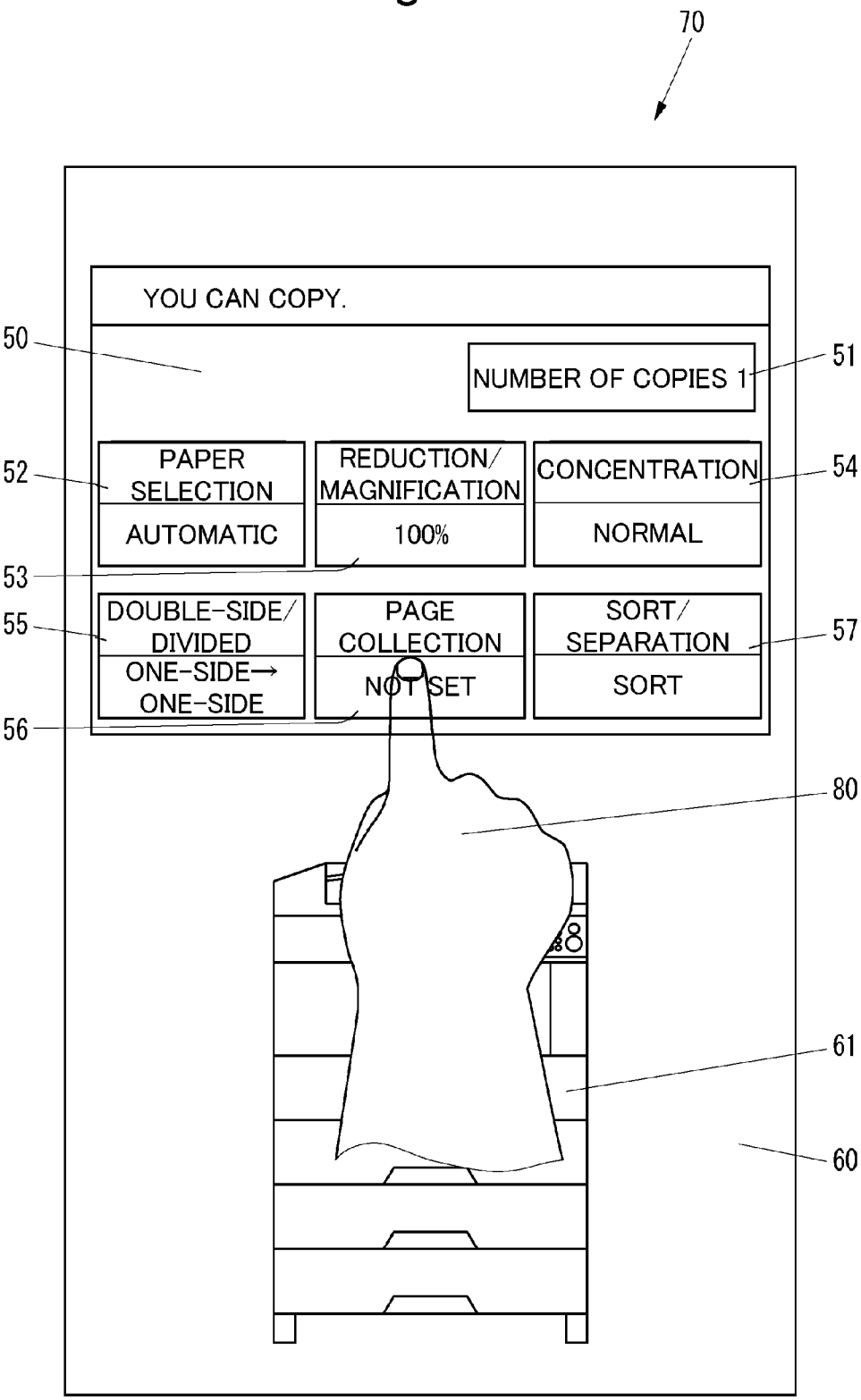
FIG. 11 is a schematic diagram illustrating one example of a synthetic image displayed on the display device in FIG. 1 in a case where an image of a virtual hand is arranged with respect to the operation image.

The AR processing section 35*a*, after processing of S103, arranges a prepared image 80 of a virtual hand, instead of the image 62 illustrating the hand on the synthetic image 70, at a position of this image 62 illustrating the hand on the taken image 60, and further generates a synthetic image 70 illustrated in an example of FIG. 11 (S104).

Figure 12:
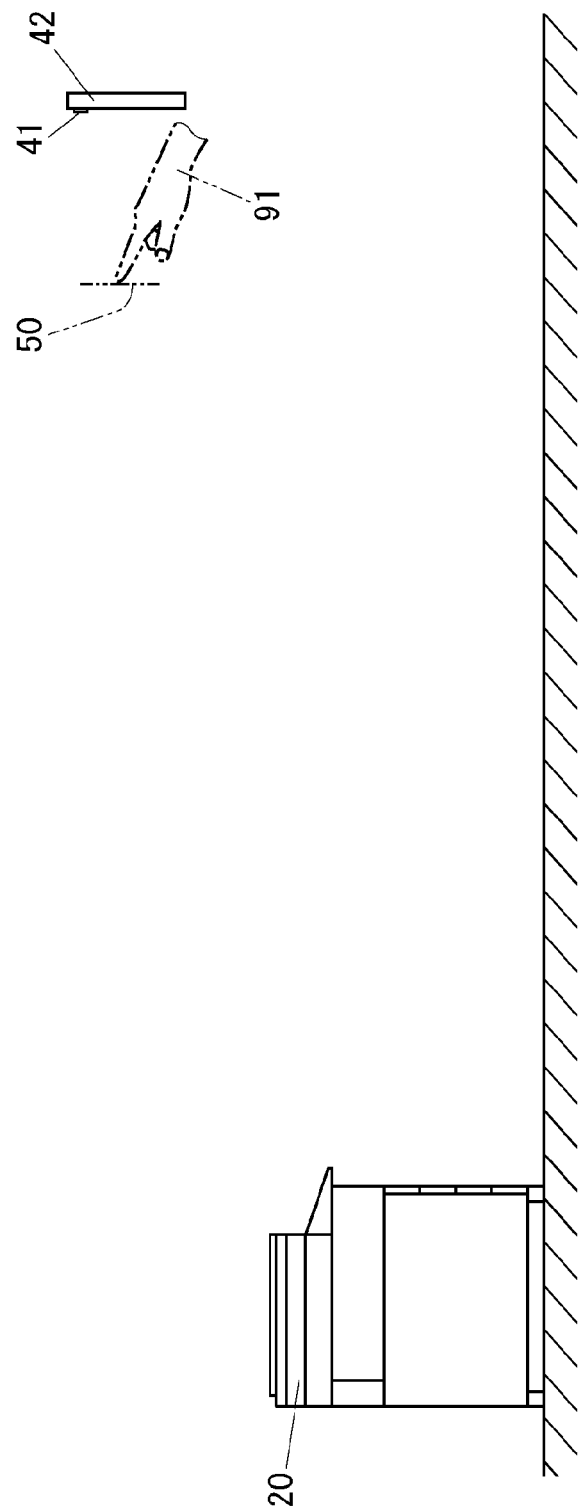
FIG. 12 is a schematic diagram illustrating positional relationship between the MFP, the virtually arranged operation image and hand, the image-taking device, and the display device when viewed from the direction orthogonal to the direction in which the image-taking is performed by the image-taking device in a case the display device displays the synthetic image illustrated in FIG. 11.

Here, the AR processing section 35*a* uses, as the image 80 of the virtual hand, at least part of the image 62 of the real hand included in the taken image 60. This image 80 is, for example, an image obtained by processing the image 62 through image processing to more clarify contrast with respect to surrounding images. The AR processing section 35*a* determines a position at which the image 80 is arranged in a manner such that positions of the operation image 50 and a fingertip of a hand 91 illustrated by the image 80 appear, for the user viewing the synthetic image 70 displayed on the display device 42, to overlap in the direction in which the image-taking is performed by the image-taking device 41, as illustrated in FIG. 12, and generates a synthetic image 70. Note that the operation image 50 and the hand 91 are arranged on a real space in FIG. 12 for easier understanding, but are actually not present on the real space.

As illustrated in FIG. 4, the AR processing section 35*a*, after processing of S104, displays, on the display device 42, the synthetic image 70 generated in S104 (S105).

The operation reception section 35*b* of the AR server 30, after processing of S105, judges whether or not any of the setting reception images 51 to 57 in the operation image 50 on the synthetic image 70 has been pressed (S106). Specifically, the operation reception section 35*b* receives operation on the setting reception images 51 to 57 based on a position (on the synthetic image 70) of the hand image 62 of the hand 90 taken by the image-taking device 41 and positions of the setting reception images 51 to 57 on the synthetic image 70. Here, upon a predefined change in the image 62 illustrating the hand 90 at a position displayed on the display device 42 as a result of its overlapping with the operation image 50, the operation reception section 35*b* receives operation corresponding to the position of the image 62 illustrating the hand 90 in this operation image 50. For example, the operation reception section 35*b* judges that the setting reception image 56 has been pressed when a position of a fingertip of the image 62 of the hand 90 in the taken image 60 taken by the image-taking device 41 overlaps with a position of the setting reception image 56 illustrated in FIGS. 7 and 9 on the synthetic image 70 and also when a size of this fingertip decreases while its position on the synthetic image 70 does not change. Then the operation reception section 35*b* receives predefined operation on the setting reception image 56. Note that, in S106, based on a position of the image 80 on the synthetic image 70 and positions of the setting reception images 51 to 57 on the synthetic image 70, the operation reception section 35*b* may receive operation on the setting reception images 51 to 57.

The stereophonic section 35*c* of the AR server 30, upon judgment in S106 that any of the setting reception images 51 to 57 on the synthetic image 70 has been pressed, makes the audio output device 43 output operation sound for the setting reception image 56 pressed on the synthetic image 70 through the stereophonic technology in a manner such that the operation sound is outputted at a position in the real space corresponding to a position of the setting reception image 56 in a virtual space (a position within the synthetic image 70 displayed on the display device 42) (S107). For example, in a case where the display device 42 displays the synthetic image 70 illustrated in FIG. 11, when the operation image 50 appears, for the user viewing the synthetic image 70 displayed by the display device 42, to be arranged in a space between the MFP 20 and the display device 42, as illustrated in FIG. 13, the stereophonic section 35c makes the audio output device 43 output operation sound for the setting reception image 56 pressed on the synthetic image 70 through the stereophonic technology in a manner such that the operation sound is outputted at a position 92 in a real space corresponding to the aforementioned position of the setting reception image 56 in the virtual space.

The operation reception section 35b, after processing of S107, notifies the operation received in S106 to the MFP 20 (S108). The control section 28 of the MFP 20 executes action in accordance with this notified operation.

The AR processing section 35a, upon judgment in S106 that none of the setting reception images 51 to 57 in the operation image 50 on the synthetic image 70 has been pressed and upon end of processing of S108, returns to processing in S102.

As described above, the AR operation system 10 receives the operation corresponding to the setting reception images 51 to 57 based on the position (on the synthetic image 70) of the image 62 of the hand 90 taken by the image-taking device 41 and the positions of the setting reception images 51 to 57 on the synthetic image 70 (S106). Thus, even without providing an input device operated through direct touch by the user, the operation on the setting reception images 51 to 57 in the operation image 50 synthesized with the taken image 60 can be received.

The human being is featured to holistically recognize information obtained through five senses to judge operation feeling. For example, the human being is featured to, when heard of operation sound from a little distant area while a section actually operated cannot be viewed, feel that a hand is located at a section where the operation sound has been heard. That is, the human being is featured to have no uncomfortable feeling even if the section where the operation sound has been heard is actually different from the section actually operated.

The AR operation system 10 can suppress the uncomfortable feeling for the operation performed on the setting reception images 51 to 57 not present in the real space with operation sound through the stereophonic technology outputted in a manner such as to be outputted at the position in the real space corresponding to the positions of the operation sections 51 to 57 on the synthetic image 70, which can therefore improve operation feeling for the setting reception images 51 to 57. As a result, the user, for example, can easily execute the operation on the setting reception images 51 to 57, making it difficult to make any mistake with the operation on the setting reception images 51 to 57.

The AR operation system 10 can suppress the uncomfortable feeling for the operation on the setting reception images 51 to 57 not present in the real space through interaction between the image 80 of the virtual hand 91 arranged with respect to the operation image 50 on the synthetic image 70 and the operation sound through the stereophonic technology outputted in a manner such as to be outputted at the position in the real space corresponding to the positions of the setting reception images 51 to 57 on the synthetic image 70, which can therefore further improve the operation feeling for the setting reception images 51 to 57.

Figure 14:
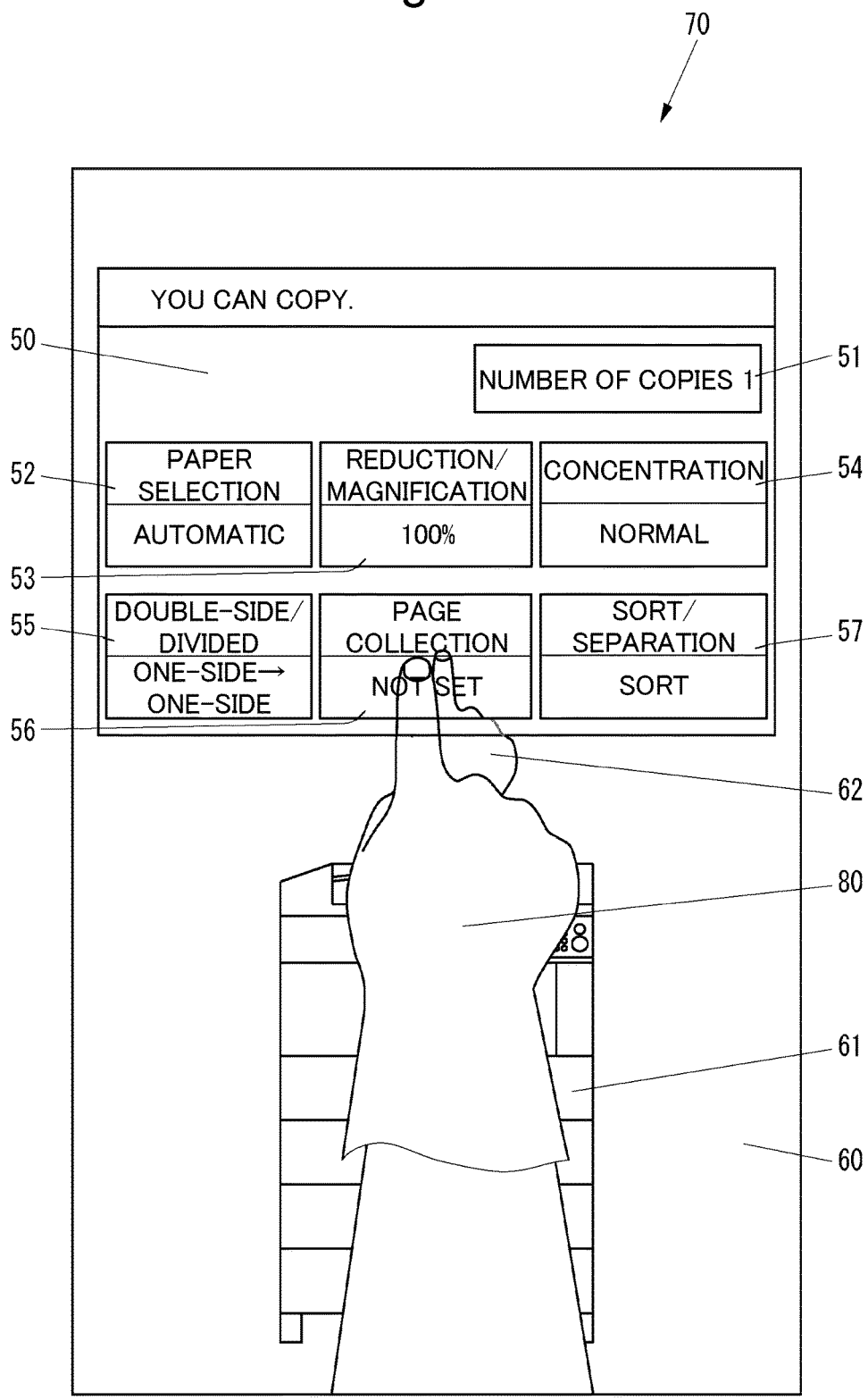
FIG. 14 is a schematic diagram illustrating one example of a synthetic image displayed on the display device illustrated in FIG. 1 in a case where the user's hand is located closer to the MFP side than the operation image and an image of a virtual hand is arranged with respect to the operation image.

The AR operation system 10 can make the image 80 of the virtual hand 91 more outstanding by not including the image 62 of the real hand 90 in the synthetic image 70, which can therefore further suppress the uncomfortable feeling for the operation by the virtual hand 91. Note that the AR operation system 10, in the processing performed by the AR processing section 35a, for example, as illustrated in FIG. 14, may display both the image 80 of the virtual hand 91 and the image 62 of the real hand 90 while keeping the image 62 of the real hand 90 included in the synthetic image 70.

Figure 15:
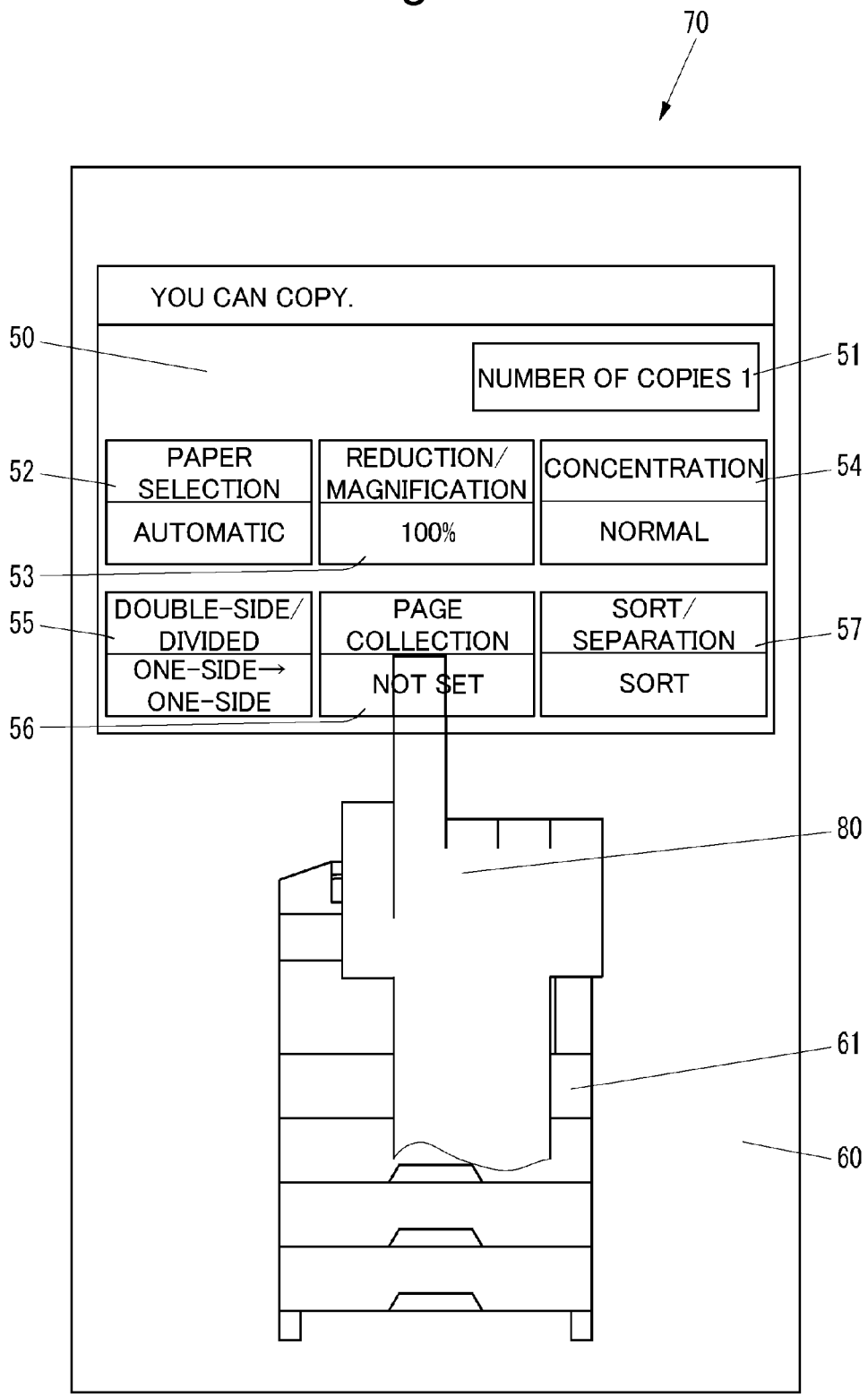
FIG. 15 is a schematic diagram illustrating one example of a synthetic image displayed on the display device in FIG. 1, an example different from the examples in FIGS. 11 and 14, in a case where an image of a virtual hand is arranged with respect to the operation image.

The AR operation system 10 uses at least the part of the image 62 of the user's own real hand 90 as the image 80 of the virtual hand 91, which can therefore further suppress the uncomfortable feeling for the operation, by the virtual hand 91, for the setting reception images 51 to 57 not present in the real space. Note that the AR operation system 10, as illustrated in FIG. 15 for example, may use, instead of the hand image 62, for example, a predefined graphic image as the image 80 of the virtual hand 91.

The AR operation system 10 may have two or more of the MFP 20, the AR server 30, the image-taking device 41, the display device 42, and the audio output device 43 manufactured as the same device. For example, the AR operation system 10 may include a portable device such as a smart phone or a head mount display which includes two or more of the AR server 30, the image-taking device 41, the display device 42, and the audio output device 43.

The AR operation system 10 may realize at least part of functions of the AR server 30 by the MFP 20. The AR operation system 10 may not include the AR server 30 in a case where all of the functions of the AR server 30 are realized by the MFP 20.

In this embodiment, the AR operation system 10 includes the MFP as the electronic device of this disclosure, but an image forming apparatus, such as a print-only device, other than the MFP may be provided as the electronic device of this disclosure, or an electronic device, such as a PC, other than the image forming apparatus may be provided as the electronic device of this disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An augmented reality operation system comprising:
 an image-taking device;
 a display device;
 a multifunction peripheral (MFP); and
 an augmented reality (AR) server including a storage device having an AR operation program stored thereon, a processor, and an audio output device,
 wherein the processor executes the AR operation program to thereby:
  generate a synthetic image and start to display the synthetic image on the display device, the synthetic image being obtained by synthesizing an operation image illustrating an operation section for operating the MFP with a taken image taken by the image-taking device, the operation image on the synthetic image being synthesized with the taken image in a manner such that the operation image appears, for a user viewing a display screen of the display device, to be arranged in a space between the MFP and the display device;
  judge, after the start of the display of the synthetic image, whether or not an image illustrating the user's hand is present on the taken image taken by the image-taking device;
  upon judgment that the image illustrating the user's hand is present on the taken image, (i) delete the image illustrating the user's hand included in the taken image from the synthetic image through image processing, (ii) by processing the image illustrating the user's hand through image processing to clarify contrast with respect to surrounding images, generate an image of a virtual hand in which at least part of the image illustrating the hand is used, and (iii) further generate, instead of the image illustrating the hand on the synthetic image, the synthetic image in which the generated virtual hand is arranged at the position of the image illustrating the hand, and display the synthetic image on the display device, and when a position of a fingertip of the image of the virtual hand overlaps with a position of a setting reception image in the operation image included in the synthetic image and also when a size of an image illustrating the fingertip decreases while the position of the fingertip does not change, judge that the setting reception image has been pressed, and make the audio output device stereophonically output operation sound for the operation section in a manner such that the operation sound is outputted at a position in a real space corresponding to a position of the operation section illustrated by the setting reception image on the synthetic image to thereby receive the operation for the MFP performed on the operation section illustrated by the operation image.

2. An augmented reality operation method by an augmented reality (AR) system, the AR system comprising an image-taking device, a display device, an multifunction peripheral (MFP), and an AR server including a storage device having an AR operation program stored thereon, a processor, and an audio output device, the method comprising: via the AR server by executing the AR operation program by the processor, generating a synthetic image and starting to display the synthetic image on the display device, the synthetic image being obtained by synthesizing an operation image illustrating an operation section for operating the MFP with a taken image taken by the image-taking device, the operation image on the synthetic image being synthesized with the taken image in a manner such that appears, for a user viewing a display screen of the display device, to be arranged in a space between the MFP and the display device; judging, after the start of the display of the synthetic image, whether or not an image illustrating the user's hand is present on the taken image taken by the image-taking device; upon judgment that the image illustrating the user's hand is present on the taken image, (i) deleting the image illustrating the user's hand included in the taken image from the synthetic image through image processing, (ii) by processing the image illustrating the user's hand through image processing to clarify contrast with respect to surrounding images, generating an image of a virtual hand in which at least part of the image illustrating the hand is used, and (iii) further generating, instead of the image illustrating the hand on the synthetic image, the synthetic image in which the generated virtual hand is arranged at the position of the image illustrating the hand, and displaying the synthetic image on the display device, and when a position of a fingertip of the image of the virtual hand overlaps with a position of a setting reception image in the operation image included in the synthetic image and also when a size of an image illustrating the fingertip decreases while the position of the fingertip does not change, judging that the setting reception image has been pressed, and making the audio output device stereophonically output operation sound for the operation section in a manner such that the operation sound is outputted at a position in a real space corresponding to a position of the operation section illustrated by the setting reception image on the synthetic image to thereby receive the operation for the MIT performed on the operation section illustrated by the operation image.

* * * * *